July 24, 1934.    J. A. PADGETT    1,967,969
TWO-PIECE DEMOUNTABLE RIM
Filed May 4, 1933    2 Sheets-Sheet 1

Inventor
J. A. Padgett.
By L. F. Landreth Jr.
Attorney

July 24, 1934.  J. A. PADGETT  1,967,969
TWO-PIECE DEMOUNTABLE RIM
Filed May 4, 1933  2 Sheets-Sheet 2
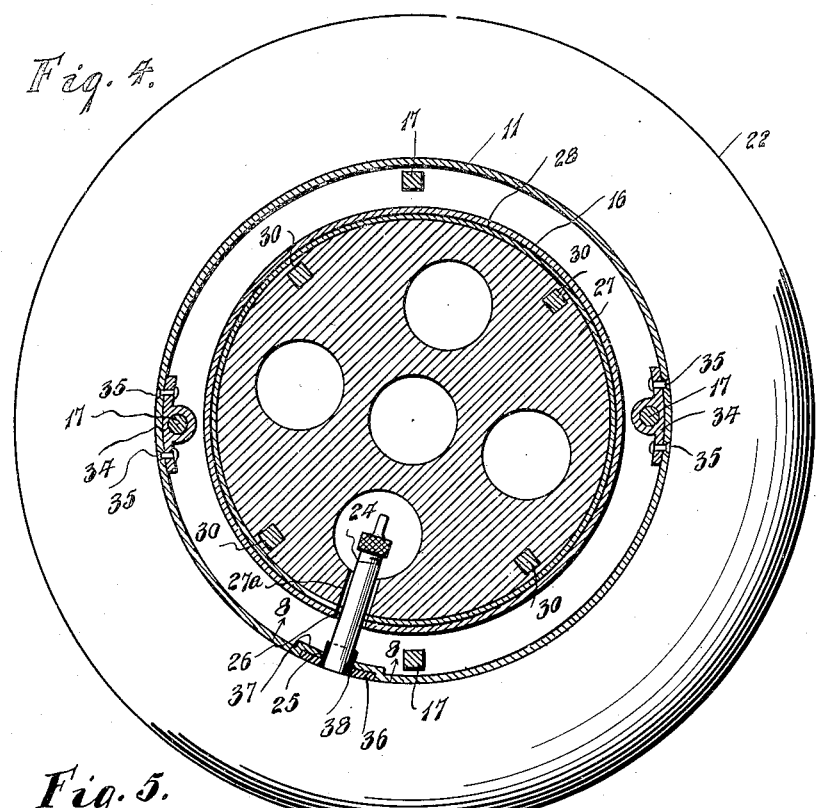
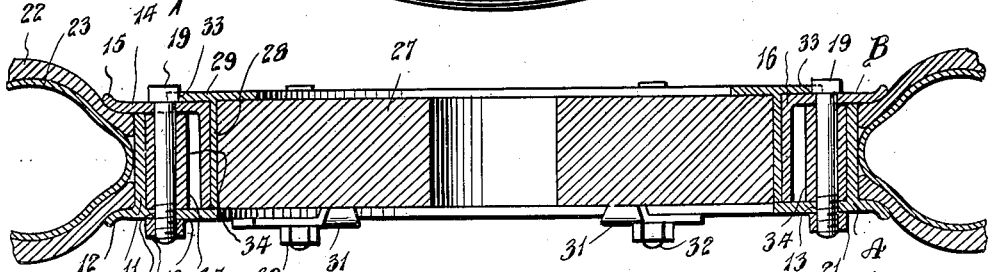
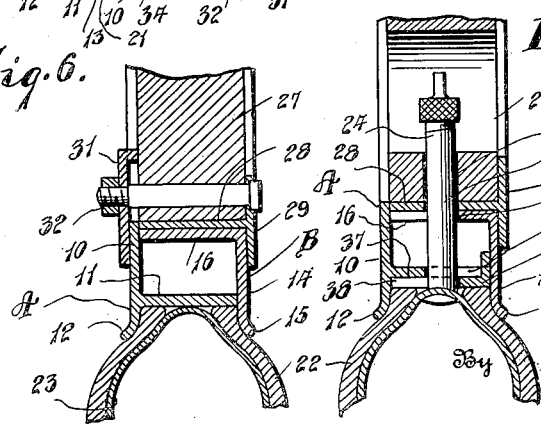
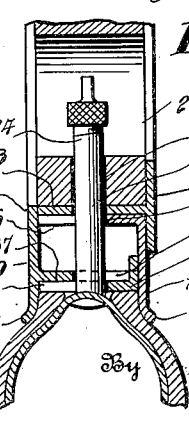
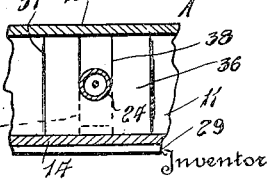
Inventor
J. A. Padgett.

Patented July 24, 1934

1,967,969

UNITED STATES PATENT OFFICE 1,967,969

TWO-PIECE DEMOUNTABLE RIM

James A. Padgett, Moody, Mo.

Application May 4, 1933, Serial No. 669,435

1 Claim. (Cl. 301—35)

This invention relates to a demountable rim adapted to mount tires, usually pneumatic tires, on automobile wheels or other vehicle wheels.

It is aimed to provide a novel construction which may be made from two durable annular pieces in combination with nut and bolt parts, and in a manner which will enable quick detachment and rigid connection to a wheel.

Another object is to provide a novel construction wherein danger of shearing the valve stem of the inner tube is particularly avoided.

A further object is to provide a construction which may be applied practically universally to automobile wheels.

The more specific objects and advantages will become apparent from a consideration of the description following taken in connection with accompanying drawings illustrating an operative embodiment.

In said drawings:—

Figure 4 is a vertical sectional view taken substantially centrally on a plane at a right angle to the axis of rotation;

Figure 5 is an enlarged cross sectional view taken on the line 5—5 of Figure 1;

Figure 6 is a detail section taken on the line 6—6 of Figure 1;

Figure 7 is a detail section taken on the line 7—7 of Figure 1, and

Figure 8 is a detail section taken on the line 8—8 of Figure 4.

Figure 1:
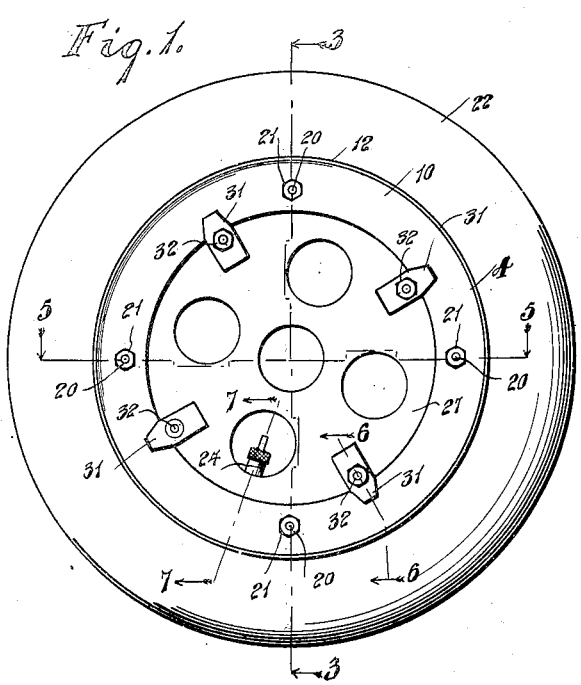
Figure 1 is a view in elevation looking toward the outside of a vehicle wheel equipped with my invention.
Figure 2:
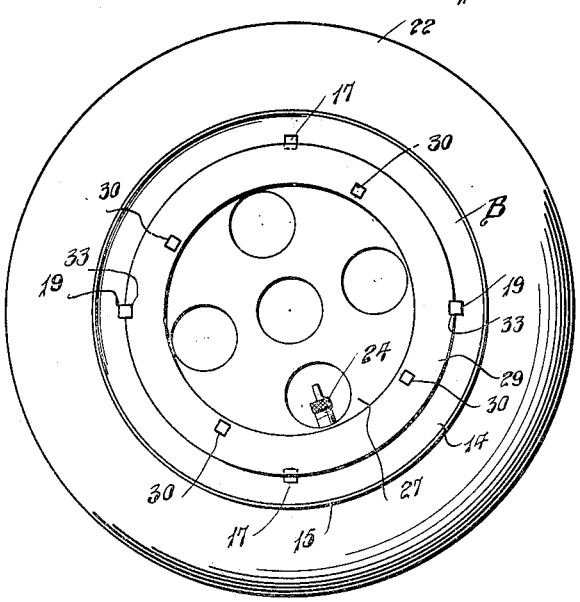
Figure 2 is a side elevation of said wheel looking from the inside.
Figure 3:
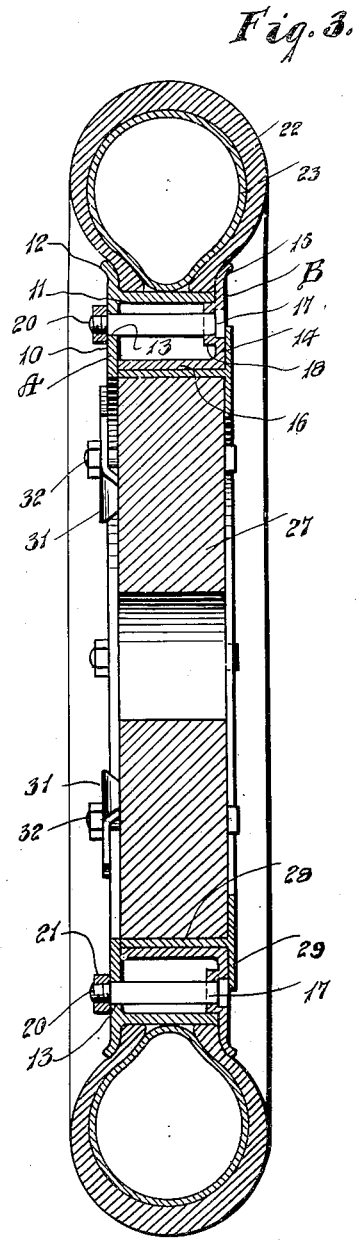
Figure 3 is an enlarged diametric sectional view taken on the line 3—3 of Figure 1.

Referring specifically to the drawings, the improved rim employs two annular sections or pieces of rim form at A and B.

Said section A has a flat side wall 10 from which an annular rim wall 11 extends at a right angle. Beyond the wall 11, wall 10 is extended at 12 to provide a tire-retaining flange 12. Wall 10 also has holes or openings 13 therethrough.

Said section B comprises a flat side wall 14, the outer edge portion of which 15 constitutes a tire-retaining flange. Integral with and extending inwardly from the wall 14 is an annular mounting wall 16, in parallelism to the wall 11.

Said wall 14 has a plurality of bolts 17 secured thereto. Said bolts 17 have squared heads that are preferably welded to the wall 14 so as to be an integral part thereof and about the shanks of the bolts 17 the walls 14 are interiorly thickened or reinforced as at 18, the portions 18 being engaged by the rim wall 11 as an aid in rigidifying the structure. Any number of the bolts 17 may be employed, for instance four as shown, and the heads of two of them in diametric alinement as at 19 or even one or all of them may project beyond the wall 14. As shown, two of them so project and the remainder have their heads terminate flush with such wall.

The bolts 17 pass through the previously mentioned openings or holes 13 and beyond the same and have screw-threaded terminals 20 to which nuts 21 are threaded.

A tire is shown mounted by the rim, being of the penumatic type and consisting of a conventional casing 22 and inner tube 23 having an inflation stem 24. The stem 24 is adapted to pass through alined openings 25 and 26 in the walls 11 and 16, respectively.

The rim is shown as applied to a wheel 27 which is equipped with a metal felly 28 surrounding the periphery thereof and with a flange 29 projecting outwardly beyond such periphery at one side of the wheel. As a result, the rim may be pushed on and off of the wheel. Bolts 30, of any desired number, extend through the wheel on which lugs 31 are placed in overlapping relation on wall 10, and clamped in that position by the application of nuts 32 to the bolts 30, such bolts also having preferably square heads as shown. Attention is called to the fact that the flange 29 is notched as at 33 so that it may interfit with the projecting heads 19, to guard against relative circumferential movement of the wheel and wheel rim. Wheel 27 and felly 28 are provided with alined and enlarged openings 27a to receive valve stem 24.

Stirrups 34 are riveted or otherwise fastened as at 35 to the wall 11 of section A so that adjacent bolts 17 may pass therethrough. This structure tends to hold the rim more rigid and to prevent slipping and shearing off of the valve stem.

In order to close the opening or slot 25 in wall 11 for reception of valve stem 24, and to prevent the inner tube from being forced therethrough when inflated, I provide a cover plate 36 that engages in a countersink 37 in wall 11 and having a slotted opening 38 to receive valve stem 24, the plate 36 being inserted in position from the edge of the wall 11 through which opening 25 opens so that the slot 38 is on the opposite side of the stem from slot 25 and each slot is closed by the wall or plate as the case may be to provide a smooth surface for the inner tube.

It is obvious that sufficient clearance is left between the various parts to enable ready attachment and detachment thereof.

The rim is applicable to practically any standard type of wheel. The flanges of the latter may be recessed or cut away so that the heads 19 interfit therewith to prevent relative turning movement when desired.

Various changes may be resorted to provided they fall within the spirit and scope of the invention.

What is claimed is:—

A demountable rim comprising two sections, each section having a side wall, said side walls being in parallelism, one section having an annular wall extending therefrom inwardly of the periphery of said walls and to the other section, the other section having an annular felly-engaging wall extending therefrom between the first annular wall and center of the wheel on which the rim is mounted, and bolts extending from one of said side walls through the other side wall connecting the sections together for unitary application to and removal from a felly, one of said bolts having its head extending outwardly beyond the adjacent side wall for interfitting engagement with a wheel flange, the other side wall extending inwardly beyond its companion side wall to overlap the wheel felly.

JAMES A. PADGETT.